United States Patent
Mitsuhashi et al.

(10) Patent No.: US 7,386,245 B2
(45) Date of Patent: Jun. 10, 2008

(54) ADJUSTING AN ANGLE OF AN OPERATION PANEL ON A MULTIFUNCTION APPARATUS

(75) Inventors: Akihiro Mitsuhashi, Fujisawa (JP); Etsuro Takahashi, Ueda (JP); Hideki Nakatsuka, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 116 days.

(21) Appl. No.: 11/065,083

(22) Filed: Feb. 25, 2005

(65) Prior Publication Data

US 2005/0185216 A1     Aug. 25, 2005

(30) Foreign Application Priority Data

Feb. 25, 2004   (JP) .............................. 2004-050259

(51) Int. Cl.
   *G03G 15/00*   (2006.01)

(52) U.S. Cl. ............................................. 399/81; 399/9

(58) Field of Classification Search ................. 399/81, 399/9, 1
See application file for complete search history.

(56) References Cited

U.S. PATENT DOCUMENTS

| 6,202,092 | B1 * | 3/2001 | Takimoto | |
| 6,507,716 | B2 * | 1/2003 | Nomura et al. | 399/81 |
| 6,795,662 | B2 * | 9/2004 | Kudo | 399/81 |
| 6,819,891 | B2 * | 11/2004 | Suzuki | 399/81 |
| 6,873,806 | B2 * | 3/2005 | Kobayashi et al. | 399/81 |
| 2001/0048823 | A1 | 12/2001 | Nomura et al. | |
| 2002/0114024 | A1 | 8/2002 | Chiu | |
| 2003/0088570 | A1 | 5/2003 | Hilbert et al. | |

FOREIGN PATENT DOCUMENTS

| EP | 1014678 | 6/2000 |
| EP | 1093287 | 4/2001 |
| JP | 8-242326 | 9/1996 |
| JP | 10-315535 | 12/1998 |
| JP | 11-143651 | 5/1999 |
| JP | 2001-160117 | 6/2001 |
| JP | 2001-292262 | 10/2001 |
| JP | 2002-007264 | 1/2002 |
| JP | 2002-344681 | 11/2002 |
| JP | 2003-233725 | 8/2003 |
| WO | 97/38523 | 10/1997 |

OTHER PUBLICATIONS

English Language Abstract of JP 2002-344681.; Nov. 29, 2002.

(Continued)

*Primary Examiner*—Susan S Lee
(74) *Attorney, Agent, or Firm*—Greenblum & Bernstein, P.L.C.

(57) ABSTRACT

A multifunction apparatus having a plurality of functions, including a copier function, retrieves user identification information from a memory card carried by the user within a detection area, obtains panel angle information that is set for the authenticated user based on the retrieved identification information, and adjusts, by a panel controller, a panel angle of an adjustable panel for the authenticated user according to the information, the panel being provided for inputting various operational instructions.

11 Claims, 10 Drawing Sheets

OTHER PUBLICATIONS

English Language Abstract of JP 2001-160117.; Jun. 12, 2001.
Trevor et al, "Issues in Personalizing Shared Ubiquitous Devices," Online! vol. 2498, 2002, pp. 56-72, XP002356517, retrieved from the Internet: URL: http://zing.ncsl.nist.gov/ubicom02/UbiComp02_Workshop/papers/2002_Trevor_Personalization.pdf on Nov. 29, 2005.
English Language Abstract of JP 2002-7264.; Jan. 11, 2002.
English Language Abstract of JP 2001-292262.; Oct. 19, 2001.
English Language Abstract of JP 10-315535.; Dec. 2, 1998.
English Language Abstract of JP 11-143651.; May 28, 1999.
English Language Abstract of JP 2003-233725.; Aug. 22, 2003.
U.S. Appl. No. 10/893,279 to Kizawa, which was filed on Jul. 19, 2004.
U.S. Appl. No. 11/065,076 to Nishizawa et al., which was filed on Feb. 25, 2005.
U.S. Appl. No. 11/065,571 to Nishizawa et al., which was filed on Feb. 25, 2005.
U.S. Appl. No. 11/065,372 to Nishizawa et al., which was filed on Feb. 25, 2005.
U.S. Appl. No. 11/065,368 to Nishizawa et al., which was filed on Feb. 25, 2005.
U.S. Appl. No. 11/065,373 to Nishizawa et al., which was filed on Feb. 25, 2005.

* cited by examiner

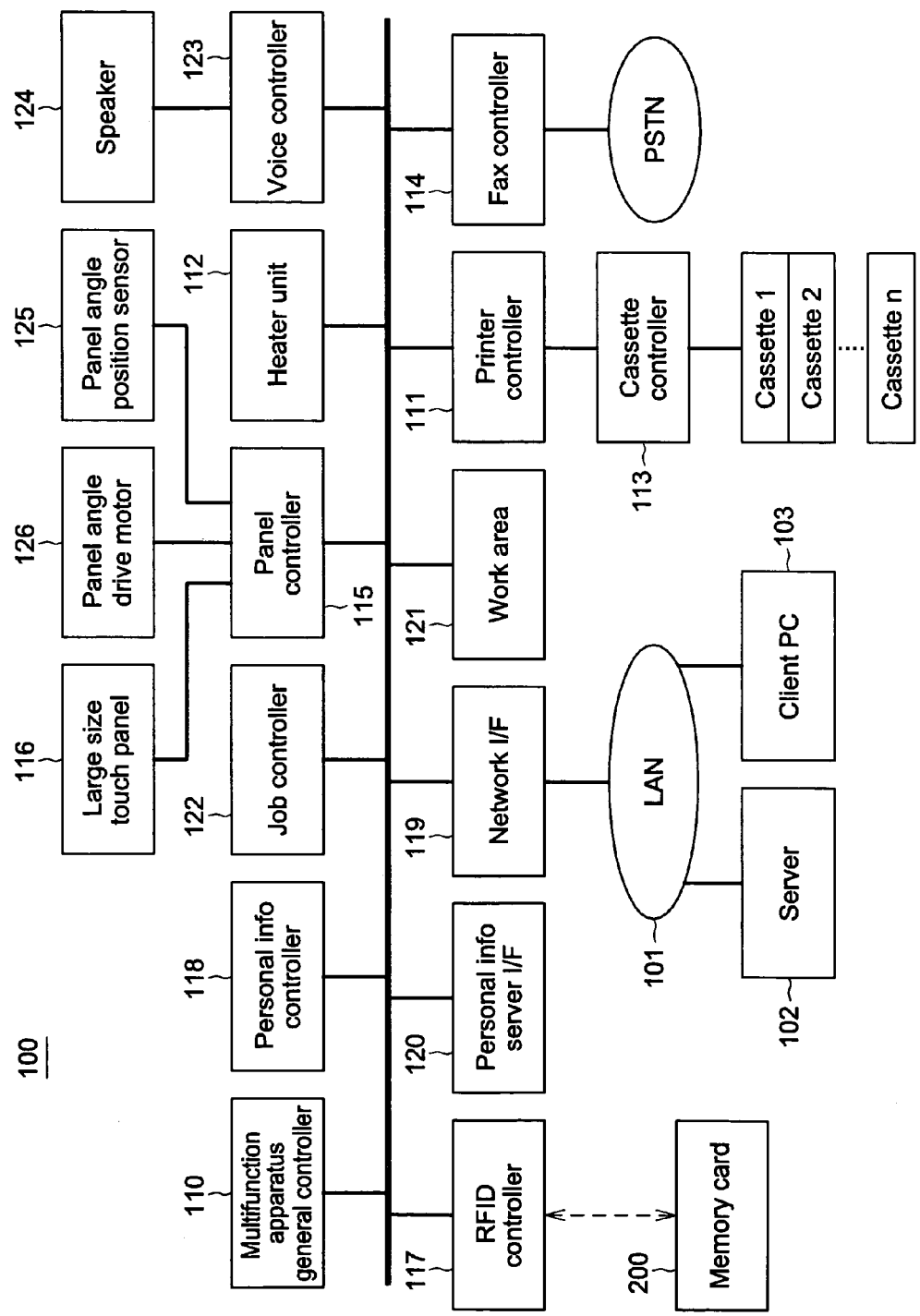

Fig.5

<Table information of memory card>

| Personal identification information |
|---|

Fig.6

<Personal information table in server>

| | |
|---|---|
| A | Personal identification information |
| B | Personal information (name,department,ID code,etc.) |
| C | Panel angle location information |

ADJUSTING AN ANGLE OF AN OPERATION PANEL ON A MULTIFUNCTION APPARATUS

BACKGROUND OF THE INVENTION

1. Field of the Invention

The present invention relates to a multifunction apparatus that includes a plurality of functions including a copier function.

2. Description of Related Art

A multifunction apparatus having a plurality of functions such as printer, copier, scanner, facsimile, and e-mail functions has become common. Recent multifunction apparatuses usually include a large-size touch panel to accommodate various functions, the panel displaying various information in an operation screen and selection buttons for the user. (e.g., Related Art 1). The height level for the touch panel is set considering an average height of users, so that the touch panel is easily viewed and operated by the users.

[Related Art 1] Japanese Patent Laid Open Application 2002-7264

However, the above methods have the following shortcomings. Even when the multifunction apparatus is provided at a location for users of wide range of ages (e.g., educational institutions including elementary schools), the position of the touch panel is set at a height for an average adult. Therefore, the position of the touch panel can be too high thus inconvenient for some users having short heights (e.g., children). In addition, when the multifunction apparatus is used by a user having a lower eye-level and/or operation level (e.g., person in a wheelchair), the multifunction apparatus is also inconvenient for such a user to operate on.

SUMMARY OF THE INVENTION

The present invention addresses the above-described problems. The purpose of the invention is to provide a multifunction apparatus that can automatically adjust an angle of a touch panel at a desired angle for the user, when the user approaches the multifunction apparatus.

In the present invention, the multifunction apparatus having a plurality of functions (including a copier function) retrieves user identification information from a memory card carried by the user within a detection area, obtains panel angle information that is set for the authenticated user based on the retrieved identification information, and controls the adjustable panel angle of a movable panel for the authenticated user according to the information, the panel being provided for inputting various operational instructions.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 1 is a functional block diagram illustrating a multifunction apparatus according to an embodiment of the invention;

FIG. 5 illustrates registration information of a memory card that is read-out/written-in by the multifunction apparatus according to the embodiment;

FIG. 6 is a data structure of a personal information table that is registered in a server (personal information server) connected to the multifunction apparatus according to the embodiment;

DETAILED DESCRIPTION OF PREFERRED EMBODIMENTS

Figure 2A:
FIG. 2 illustrates how a large-size touch panel is moved by the multifunction apparatus according to the embodiment.

The embodiments of the present invention are explained in the following, in reference to the above-described drawings.

FIG. 1 is a functional block diagram of multifunction apparatus 100 according to an embodiment of the present invention. FIG. 1 also shows a portion of a network. Multifunction apparatus 100 can be connected to various servers 102 and client PCs 103, via LAN 101. Server 102 can be a personal information server that stores a personal information table and performs personal authentication and personal information distribution. Server 102 can also be a web server that executes a job selected from a menu in a remote procedure method. Although multifunction apparatus 100 includes printer, copier, scanner, facsimile, and e-mail functions, FIG. 1 only shows blocks related to the printer and facsimile functions.

Multifunction apparatus general controller 110 controls the overall multifunction apparatus 100. Printer controller 111 executes a process that converts printout data (given from a client) into image data in a predetermined format. Printer controller 111 especially gives a warm up instruction to heater unit (fusing apparatus) 112 in an image generation unit (not shown in the figure), and gives a cassette selection instruction to cassette controller 113. Cassette controller 113 selects an indicated cassette from a plurality of vertically stacked cassettes (1)-(n), and feeds paper to the image generation unit. Fax controller 114 has a modem that is connected to a PSTN to execute steps for a facsimile communication.

Panel controller 115 displays an operation screen and the like on large-size touch panel 116 and analyzes an operation input by the user from where the user touched on large-size touch panel 116 and from the displayed contents. In addition, panel controller 115 outputs a control signal that adjusts the angle of large-size touch panel 116, according to personal information table data stored in a work area (later described).

RFID controller 117 reads and writes data on memory card 200 using electromagnetic wave signals. When a magnetic field is applied to memory card 200 from RFID controller 117, the reflected electromagnetic wave includes effect (information) corresponding to the memory contents of memory card 200. RFID controller 117 detects the memory contents of memory card 200 using the reflected electromagnetic wave. Conversely, electromagnetic wave signals applied from RFID controller 117 to memory card 200 is used to write information because the signals have a magnetic influence on memory card 200. RFID controller 117 performs non-contact reading/writing of card registration data, via electromagnetic wave signals, from/into memory card in the detection area approximately within a 1-meter radius range.

Personal information controller 118 manages the write-in destination of the registration data, which is read from memory card 200. In addition, personal information controller 118 notifies RFID controller 117 of data to be written in memory card 200. Network I/F 119 is a section that interfaces with LAN 101. Personal information server I/F 120 executes a process for communicating with a personal information server among servers 102 on LAN 101. Work area 121 stores data received from memory card 200 and personal information server. Job controller 122 provides a command to an appropriate unit when a job is executed using a function such as copier, printer, facsimile, scanner, or e-mail functions.

Voice controller 123 stores voice data for a voice guidance. Upon receiving a voice guidance instruction (in synchronization with the user's operation) from panel controller 115 and job controller 122, voice controller 123 outputs the corresponding voice data to speaker 124. In addition, the voice guidance to be output to speaker 124 is changed according to the personal information table data stored in the work area (later described). It is preferable that the voice guidance is voice data that assists the operation from the operation screen displayed on large-size touch panel 116. However, other forms of voice guidance can be output.

Panel angle position sensor 125 detects an angle of large-size touch panel 116. Panel angle drive motor 126 receives a control signal from panel controller 115 and adjusts the angle of large-size touch panel 116.

Figure 2B:
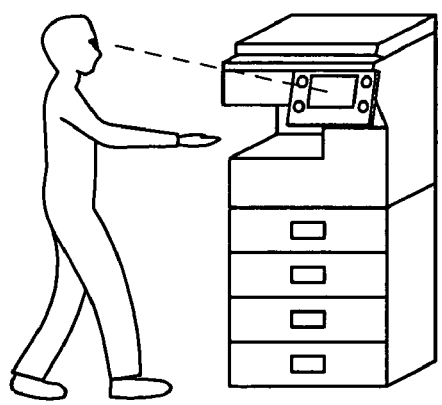

FIG. 2 illustrates how large-size touch panel 116 is moved by multifunction apparatus 100. FIG. 2(*a*) illustrates an angle setting for a user having a tall height (e.g., adult). FIG. 2(*b*) illustrates an angle setting for a user having a short height or lower eye level (e.g., child, person in a wheelchair, etc.).

As shown in the above figures, for the user having a tall height, large-size touch panel 116 is set at an angle that positions the panel facing upward. Since the tall user can look down large-size touch panel 116, it is easy for the user to operate on the apparatus. For a user having a short height and the like, however, the angle is set so that the panel faces forward in relation to the apparatus. Therefore, the short user and the like can look straight at large-size touch panel 116, which makes it easy for the user to operate on the apparatus.

Figure 3:
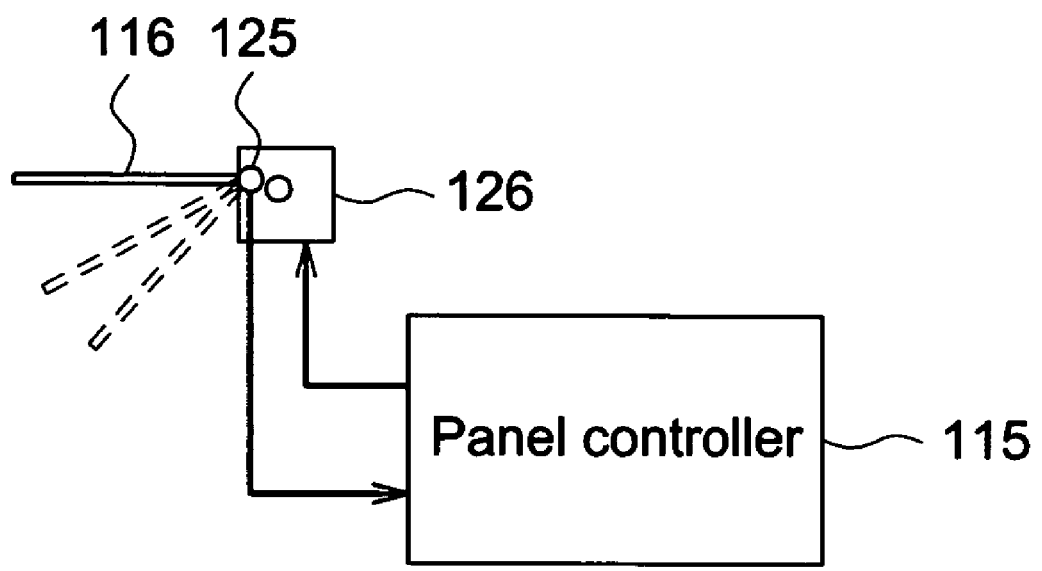
FIG. 3 is a schematic side view of a configuration of the large-size touch panel of the multifunction apparatus according to the embodiment.

FIG. 3 is a schematic side view of a configuration of large-size touch panel 116 of multifunction apparatus 100. The left side in the figure is the front side of multifunction apparatus 100.

As shown in FIG. 3, panel angle drive motor 126 is connected to panel controller 115. One end of large-size touch panel 116 is movably attached to a side of panel angle drive motor 126 facing the front side of multifunction apparatus 100. Panel angle position sensor 125 is located on one side of large-size touch panel 116 and detects an angle of large-size touch panel 116.

Figure 4:
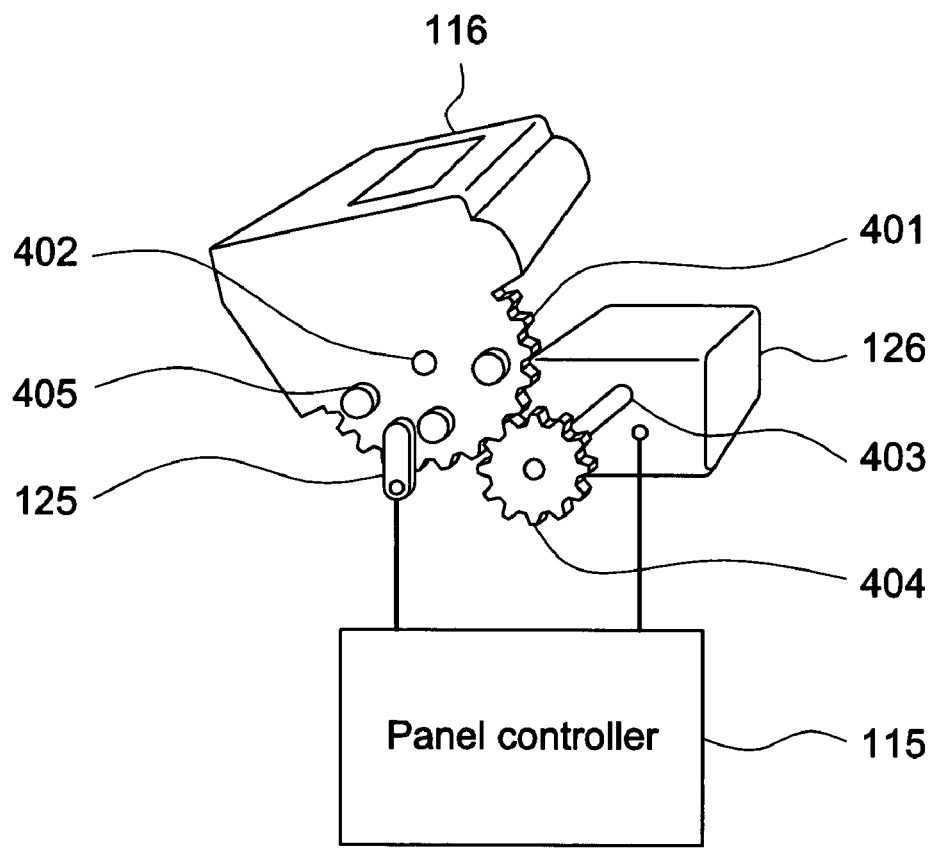
FIG. 4 is an oblique view of a specific configuration of the large-size touch panel of the multifunction apparatus according to the embodiment.

FIG. 4 illustrates a specific configuration of large-size touch panel 116. Gear 401 is provided to a side of large-size touch panel 116 facing the inside of multifunction apparatus 100. Gear 401 has a semi-circular shape, having circular-shaped pivot shaft 402 as a pivot point of large-size touch panel 116. Gear 401 meshes with gear 404 located at one end of drive shaft 403, the shaft 403 being installed to panel angle drive motor 126. Due to this meshing, the drive of panel angle drive motor 125 is transmitted to large-size touch panel 116. A plurality of position markers 405 (3 markers in this embodiment) are provided at a predetermined interval on one side of gear 401. Panel angle position sensor 125 is located where the positions of position markers 405 are detected. By detecting the position of position markers 405, the angle of large-size touch panel 116 is detected. Panel controller 115 drives panel angle drive motor 126 according to the detected angle of panel angle position sensor 125 so that the angle of large-size touch panel 116 is detected.

FIG. 5 illustrates the registration information of memory card 200.

As shown in the figure, memory card 200 stores only user ID as personal identification information. It is preferable to limit the registration information (of memory card 200) to user ID, and not to store other personal information, for security reasons. However, other personal information and/or group information can be stored.

FIG. 6 illustrates a data structure of a personal information table that is registered in the personal information server (as server 102).

A personal information table is created for each registered user. As shown in FIG. 6, the personal information table includes a user ID (personal identification information); personal information such as a department name to which the user belongs; and panel angle position information associated with the registered user. Panel angle position information registers an angle of large-size touch panel 116 that is the most suitable for the registered user.

Figure 7:
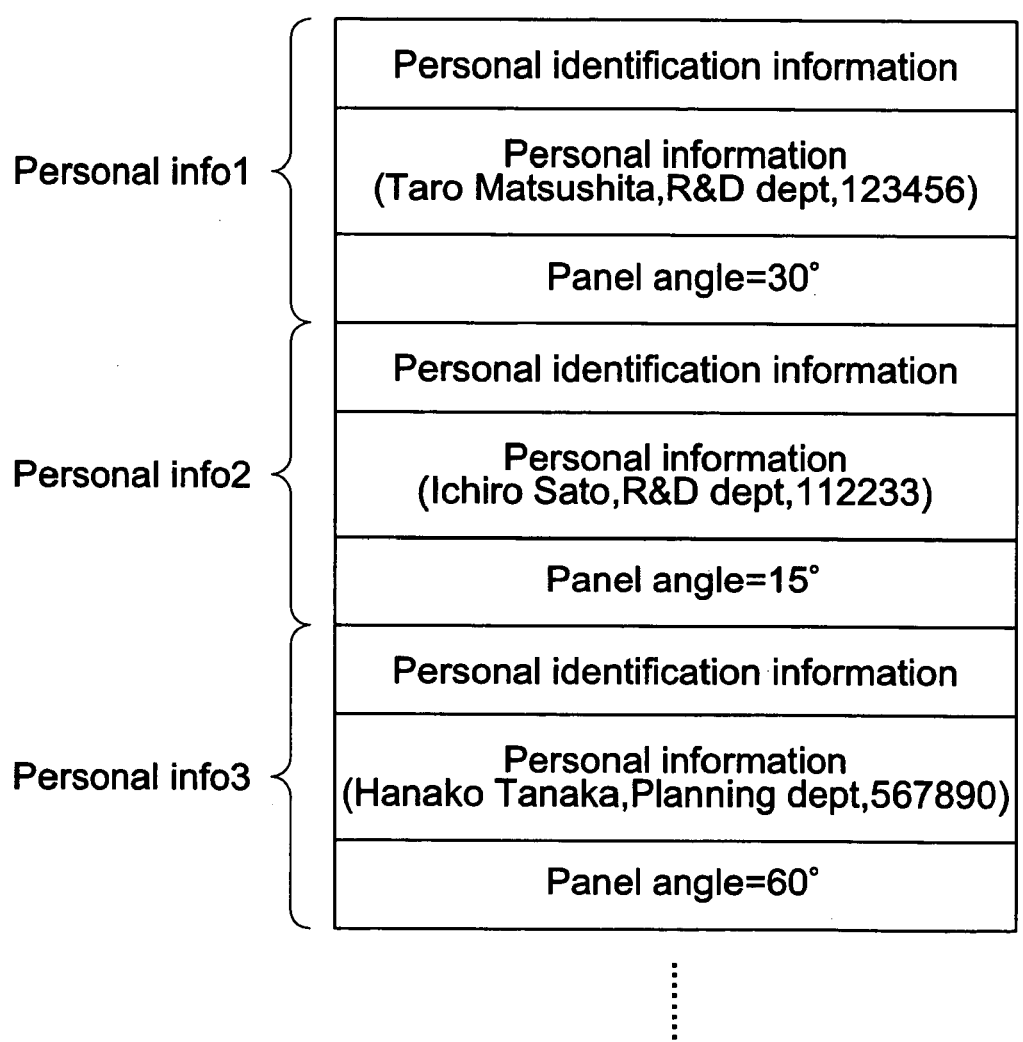
FIG. 7 illustrates an example of the personal information table that is configured for a certain user by the multifunction apparatus according to the embodiment.

FIG. 7 illustrates an example of the personal information table that is configured for a certain user. In this example, the table is configured for 3 users: "Taro Matsushita", "Ichiro Sato", and "Hanako Tanaka".

In personal information 1, "Taro Matsushita" is registered as a name, "R&D Dept." is registered as a department name to which the user belongs, and "123456" is registered as an ID code. In addition, "30°" is registered as panel angle position information. Similarly, in personal information 2, "Ichiro Sato" is registered as a name, "R&D Dept." is registered as a department name to which the user belongs, and "112233" is registered as an ID code. In addition, "15°" is registered as panel angle position information. In personal information 3, "Hanako Tanaka" is registered as a name, "Planning Dept." is registered as a department name to which the user belongs, and "567890" is registered as an ID code. In addition, "60°" is registered as panel angle position information.

The angle registered as the panel angle position information is a degree deviated from a horizontal position of large-size touch panel 116. Thus, it can be understood that "Ichiro Sato" in personal information 2 is the tallest user, while "Hanako Tanaka" in personal information 3 is the shortest user.

Figure 8:
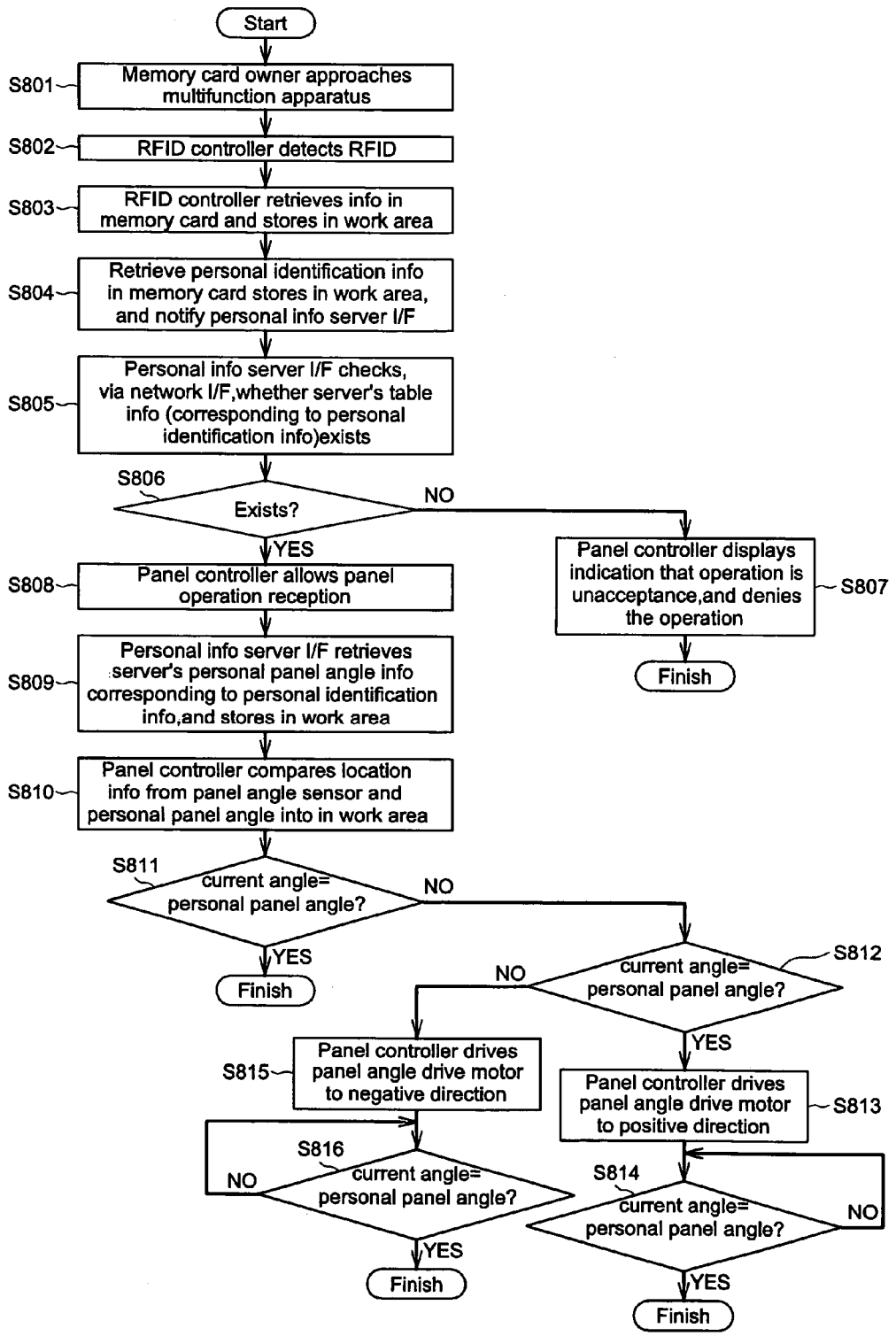
FIG. 8 is a flowchart illustrating a process when a user specifies an operation on the multifunction apparatus according to the embodiment.

Next, FIG. 8 is used to illustrate a situation where the user instructs an operation on multifunction apparatus 100 according to the embodiment of the invention.

When a user (operator) having memory card 200 approaches multifunction apparatus 100 (S801), RFID controller 117 detects the user (S802). For example, memory card 200 having the personal identification information (user ID) is inserted into an employee badge holder carried by the user (e.g., a holder hanging from the user's neck). When the user carrying memory card 200 approaches the detection area of the RFID controller 117 (in this example, approximately within 1 m range), RFID controller 117 scans the user ID in memory card 200.

RFID controller 117 stores the user ID scanned from the memory card 200 into work area 121 (S803). Multifunction apparatus general controller 110 retrieves the user ID stored in work area 121 and notifies personal information server I/F 120 via network I/F 119 (S804).

As described later, upon receiving the user ID, the personal information server (as server 102) checks whether a personal information table of the user having the scanned user ID is registered, and transmits data indicating whether such a table is registered.

Personal information server I/F 120 checks whether the user is registered in the personal information server, determining from the transmitted data indicating whether table is registered (S805). When the user's personal information table is not registered ("NO" at S806), personal information server I/F 120 outputs "notification of non-registered user detection" to panel controller 115. Upon receiving the "notification of non-registered user detection", a message stating that the apparatus cannot be used is displayed on large-size touch panel 116. At the same time, the operation is not accepted at large-size touch panel 116 (S807).

When the user's personal information table is registered ("YES" at S806), panel controller 115 accepts the operation from large-size touch panel 116 (S808). Then, personal information server I/F 120 retrieves, from the personal information server, the panel angle position information of the detected user and stores the information in work area 121 (S809).

Panel controller 115 compares the angle position information of large-size touch panel 116 detected by panel angle position sensor 125 (hereafter referred to as "current angle position information") and the angle position information of the user stored in work area 121 (hereafter referred to as "personal panel angle position information") (S810). When the current angle position information and the personal panel angle position information is the same ("YES" at S811), panel controller 115 completes the process of adjusting the angle of large-size touch panel 116.

When the current angle position information and the personal panel angle position information is not the same ("NO" at S811), it is determined whether the current angle is smaller than the personal panel angle (S812). When the current angle is smaller than the personal panel angle, panel controller 115 drives panel angle drive motor 126 into a positive direction (increasing the angle of large-size touch panel 116) (S813). Then, it is determined whether the current angle position information is the same as the personal panel angle position information (S814). When the current angle position information is the same as the personal panel angle position information, the process of adjusting the angle of large-size touch panel 116 is completed.

Conversely, when the current angle is larger than the personal panel angle (at S812), panel controller 115 drives panel angle drive motor 126 into a negative direction (decreasing the angle of large-size touch panel 116) (S815). Then, it is determined whether the current angle position information is the same as the personal panel angle position information (S816). When the current angle position information is the same as the personal panel angle position information, the process of adjusting the angle of large-size touch panel 116 is completed.

Figure 9:
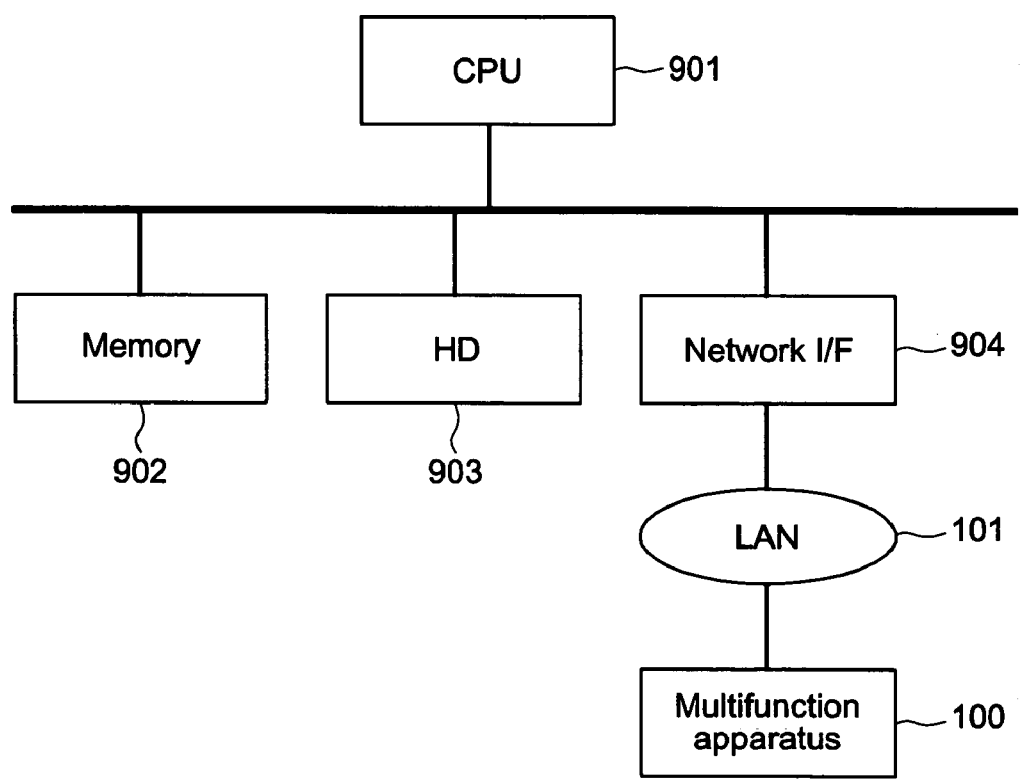
FIG. 9 is a functional block diagram of the server connected to the multifunction apparatus according to the embodiment.

FIG. 9 is a functional block diagram of server 102 connected to multifunction apparatus 100, via LAN 101, according to the embodiment. Server 102 shown in FIG. 9 includes CPU 901 that controls the entire apparatus. Memory 902 stores control programs to be used by CPU 901 for controlling the entire apparatus, and has a function to perform as work memory of CPU 901. Hard disk (HD) 903 stores information to be distributed to multifunction apparatus 100 according to the present embodiment. For example, when server 102 functions as a server for personal information, the personal information table is stored for each registered user. When server 102 functions as a web server, server 102 stores menus for multifunction apparatus 100 and related jobs. Network interface (I/F) 904 interfaces with LAN 101.

Figure 10:
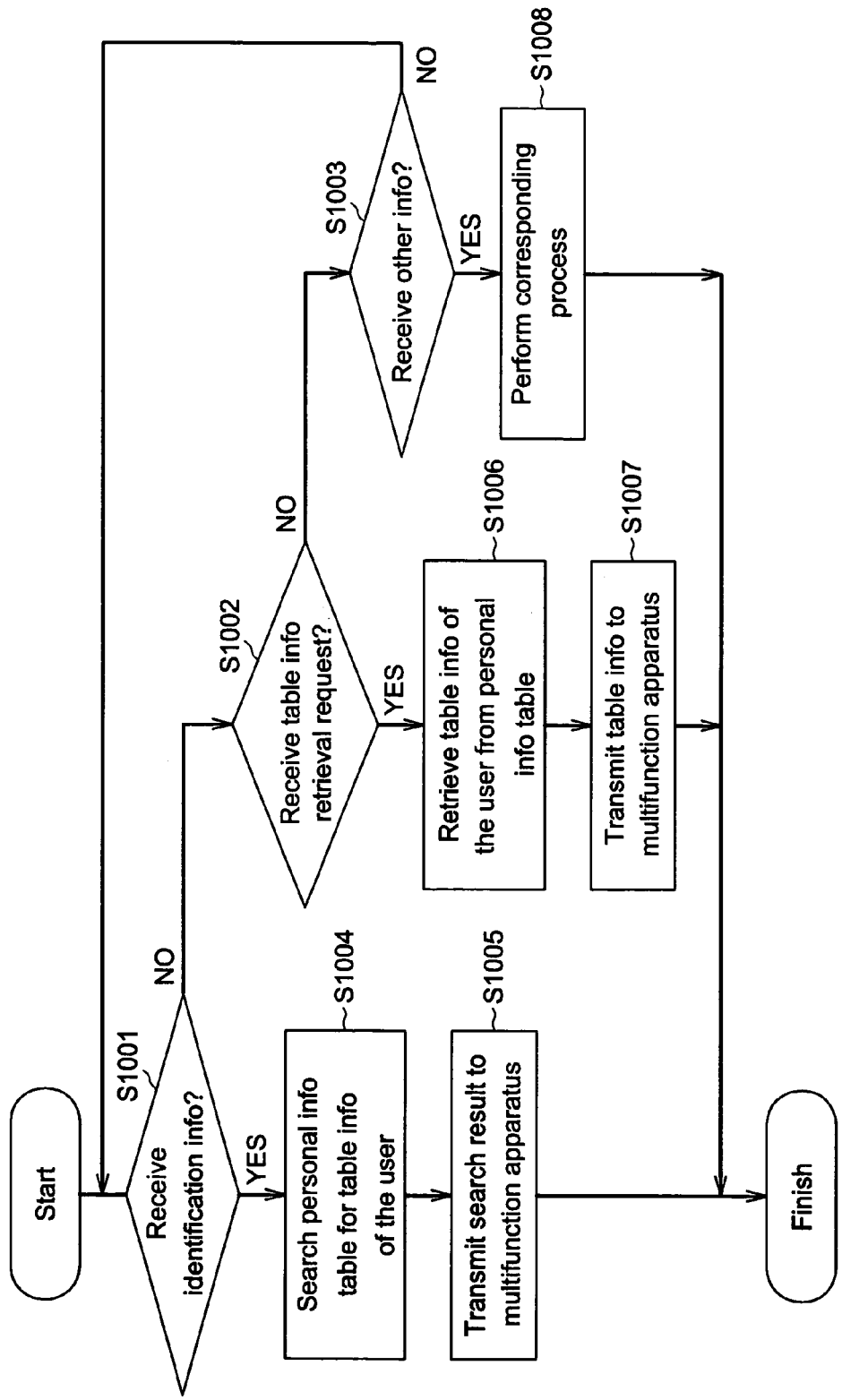
FIG. 10 is a flowchart illustrating an operation of a personal authentication server connected to the multifunction apparatus according to the embodiment.

FIG. 10 illustrates an operation when server 102 having the above-described configuration functions as a personal authentication server.

Server 102 as a personal authentication server monitors, in an idle state, a reception of various information from multifunction apparatus 100 according to the present embodiment. In particular, server 102 monitors receptions of identification information (user ID) (S1001), request to retrieve table information (S1002), and other information (S1003).

When identification information is received at S1001, during the monitoring of receptions of various information, table information of the registered user is searched from the personal information table stored in HD 903 (S1004). Accordingly, it is determined whether the received identification information is registered in the personal information table. Then, the result of the search (i.e., whether the identification information is registered) is transmitted to the accessing multifunction apparatus 100 (S1005).

When a request to retrieve table information is received at S1002, table information of the registered user is retrieved from the personal information table stored in HD 903 (S1006). Accordingly, the table information of the registered user (associated with the previously received identification information) is retrieved. Then, the table information is transmitted to the accessing multifunction apparatus 100 (S1007).

When other information is received at S1003, a process required for the information is performed (S1008). When various processes are completed at S1005, S1007, or S1008, server 102 terminates the process. Accordingly, server 102 determines and executes the required process according to the information received from multifunction apparatus 100.

According to multifunction apparatus 100 of the present embodiment, panel angle information that is preset for the authenticated user is retrieved based on identification information read from memory card 200. Then, panel controller 115 controls the angle of large-size touch panel 116 according to the panel angle information. Therefore, when the user approaches multifunction apparatus 100, the angle of large-size touch panel 116 is automatically adjusted to a desired angle set by the user.

Additionally, the present embodiment illustrates a situation where server 102 (functioning as a personal information server) registers personal information table that includes personal information and panel angle position information, so that multifunction apparatus 100 retrieves the information (e.g., personal information) and stores the information in work area 121. Accordingly, it is not necessary for multifunction apparatus 100 to register the personal information table, which requires a large-size memory, while automatically adjusting the angle of large-size touch panel 116 to a desired angle set by the user. However, the present invention is not limited to the above-described embodiment. For example, multifunction apparatus 100 can install a large memory apparatus (e.g., hard disk apparatus) where the personal information is registered and from which the information is retrieved. In this case, apparatus by itself can automatically adjust the angle of large-size touch panel 116 to a desired angle set by the user.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-050259 filed on Feb. 25, 2004, entire content of which is expressly incorporated by reference herein.

What is claimed is:

1. A multifunction apparatus having a plurality of functions, including a copier function, that is interfaced via a network to a server that stores user information, comprising:
    an operation panel that displays on an operation menu, an angle of said operation panel being adjustable;
    an information retrieval unit that transmits an electromagnetic wave signal to memory medium carried by a user and retrieves identification information of the user;
    a communication controller that communicates with the server to send the retrieved identification information of the user to the server and to obtain user information from the server in accordance with the retrieved identification information of the user, the obtained user information including panel angle information; and
    a panel controller that adjusts the angle of said operation panel for the user, according to the user information obtained from the server.

2. The multifunction apparatus of claim 1, wherein said operation panel comprises a touch panel.

3. The multifunction apparatus of claim 2, wherein said panel controller adjusts the angle of said operation panel for the user when the user information corresponds to the identification information of the user stored in the server.

4. The multifunction apparatus of claim 3, wherein said panel controller does not accept an operation for the operation menu and displays a message on said operation panel stating that the operation is not accepted when the user information corresponding to the identification information of the user is not stored in the server.

5. A method for adjusting an operation panel of a multifunction apparatus having a plurality of functions, including a copier function, that is connected to a server that stores user information via a network, the operation panel displaying an operation menu, comprising:
    transmitting an electromagnetic wave signal to a memory medium carried by a user, to retrieve identification information of the user;
    sending the retrieved identification information of the user to the server;
    obtaining user information from the server related to the retrieved identification information of the user, the user information including panel angle information; and
    controlling an angle of the operation panel in accordance with the user information obtained from the server.

6. The method of claim 5, wherein said operation panel comprises a touch panel.

7. The method of claim 6, wherein controlling an angle of the operation panel comprises adjusting the angle of the operation panel for the user when the user information corresponds to the identification information of the user stored in the server.

8. The method of claim 7, further comprising not accepting an operation for the operation menu and displaying a message on the operation panel stating that the operation is not accepted when the user information corresponding to the identification information of the user is not stored in the server.

9. An apparatus having a copier function that is interfaced with a server via a network, comprising:
    an operation panel, an angle of said operation panel being adjustable;
    an information retrieval unit that transmits an electromagnetic wave signal to a memory medium carried by a user and retrieves identification information of a specific user;
    a communication controller that communicates with the server to send the retrieved identification information of the specific user to the server, to receive data indicating whether user information is stored in the server and to obtain the user information from the server, the user information corresponding to the retrieved identification information of the specific user and including a desired operation panel angle for the specific user; and
    a panel controller that adjusts the angle of the operation panel for the specific user in accordance with the user information obtained from the server.

10. The apparatus of claim 9, wherein said operation panel comprises a touch panel.

11. The apparatus of claim 9, wherein a message is displayed on said operation panel stating that operation of the apparatus is not permitted when the user information corresponding to the retrieved identification information of the specific user is not stored in the server.

* * * * *